S. BERGER.
WHEEL FASTENING MEANS FOR MECHANICAL TOYS.
APPLICATION FILED FEB. 11, 1920.
1,367,228. Patented Feb. 1, 1921.
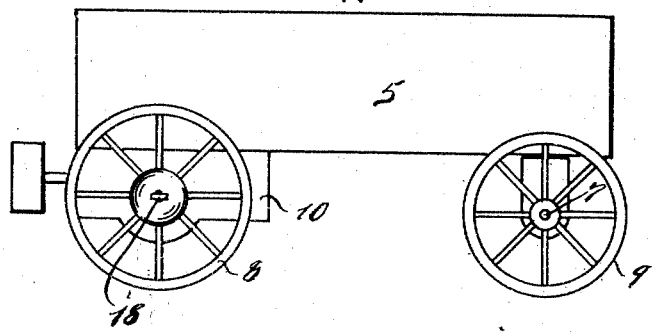
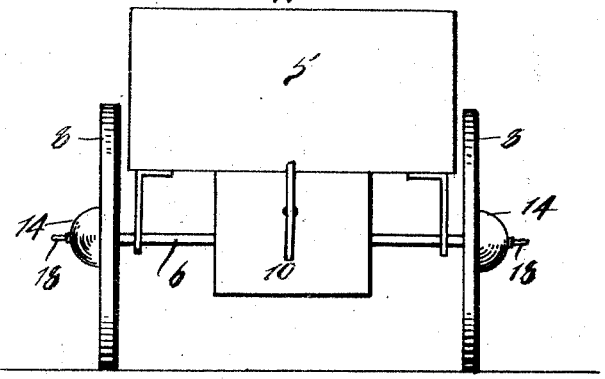
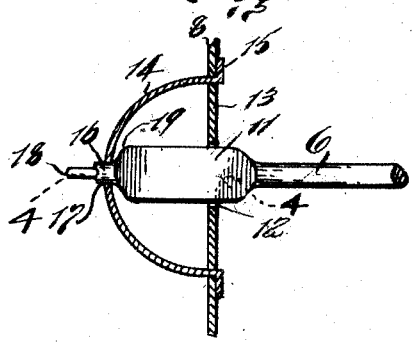
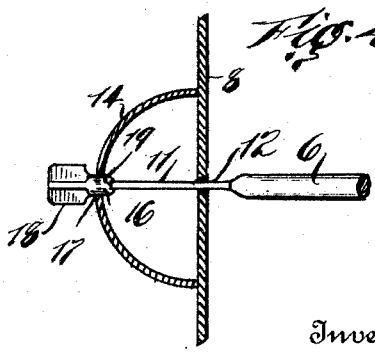
Inventor
Samuel Berger.
By his Attorney

UNITED STATES PATENT OFFICE.

SAMUEL BERGER, OF NEWARK, NEW JERSEY, ASSIGNOR TO FERDINAND STRAUSS, INC., OF NEW YORK, N. Y., A CORPORATION OF NEW YORK.

WHEEL-FASTENING MEANS FOR MECHANICAL TOYS.

1,367,228.   Specification of Letters Patent.   Patented Feb. 1, 1921.

Application filed February 11, 1920. Serial No. 357,909.

*To all whom it may concern:*

Be it known that I, SAMUEL BERGER, a citizen of the United States of America, residing at Newark, Essex county, State of New Jersey, have invented certain new and useful Improvements in Wheel-Fastening Means for Mechanical Toys, of which the following is a full, clear, and exact description.

This invention relates to improvements in wheel fastening means, more particularly for light structures, such as mechanical toys, in which the matter of expense is a highly important feature. One of the objects of my invention is to obviate the necessity of solder, pins or riveting to secure wheels to a driven axle. To carry out my improvement, I provide a fastening means for wheels dependent to a great extent upon the preshaping of the axle and hub of the wheel, whereby considerable hand labor is avoided, and thus reducing the cost of production.

I will now describe my invention in detail, the novel features of which I will finally claim, reference being had to the accompanying drawing, wherein:—

Figure 1 is a side elevation of a mechanical toy, embodying my improvement;

Fig. 2 is an end view looking from the left in Fig. 1;

Fig. 3 is a sectional view, enlarged, of a portion of a wheel and axle, illustrating my improved fastening means; and Fig. 4 is a sectional plan view, the section being taken on a line 4—4 in Fig. 3.

To illustrate my improvement, I have embodied same in a mechanical toy, in the form of a vehicle, consisting of a body member 5, having axles 6 and 7 for the front and rear wheels 8 and 9, respectively. The rear axle 6 has in connection therewith a motor (not shown) within a box or casing 10. To obviate the use of pins, solder or riveting to secure the rear wheels (in this instance), to the cylindrical driven axle 6, I provide said axle near the ends thereof with a flattened portion 11 to engage a slot 12 of a similar shape, in the hub portion 13 of the wheels 8. To support the wheels in a vertical position, I provide the same with a supplemental hub 14 which is attached to the wheel preferably by clips 15. The outer ends of the axle are cylindrical for a short distance beyond the adjacent end of the flattened portions 11. Said cylindrical portions (indicated by 16) engage a round opening 17 in the supplemental hubs 14. Beyond the cylindrical portions 16 of the ends of the axle, the axles are again flattened as at 18. The flattened portions or flattened outer ends of the axle prevent the wheels from being removed in one direction, and the adjacent ends 19 of the flattened portions 11, intermediate the flattened outer ends 18, prevent the wheels from moving too far in the opposite direction.

From the foregoing it will be seen that the wheels 8 are held against abnormal movement, longitudinally of the shaft 18, by the flattened portions 18 and 11, and also it will be seen that the wheels are rotatably connected to the axle by the flattened portions 11, intermediate the ends of the axle, engaging the oblong openings 12, in the wheels. The flattened portions 11 are produced by pressing or otherwise, before the wheels are applied thereto. After the wheels are placed on the axle and the openings 12 caused to engage the flattened portions 11, and the cylindrical portions 16 caused to engage the openings 17 in the supplemental hub 14, the outer ends of the axle will be flattened, as indicated by 18, by a suitable instrument or tool. By means of the above mentioned flattened portions of the axle, I am able to effectively connect an axle and wheels without resorting to pins, solder, etc., and from the manufacturing standpoint is superior to the said usual expedients. The object of flattening the axle intermediate its ends, as at 11, is to produce a key effect or to adapt same to fit an opening that is not round, whereby rotation can be imparted to a coacting wheel. The flattened ends 18 will of course be wider than the diameter of openings 17.

Having described my invention, what I claim and desire to secure by Letters Patent is:

1. The combination of a cylindrical axle having a flattened portion intermediate the ends thereof, a wheel engaging said flattened portion, a supplemental hub carried by the wheel engaging the cylindrical portion of the axle adjacent one end of said flattened portion, the portion of said axle which extends beyond said supplemental hub being flattened to prevent said wheel from being moved off the axle in the direction of the end of said axle.

2. The combination of a cylindrical axle having a flattened end, a flattened portion adjacent said flattened end but slightly separated therefrom to provide a cylindrical portion between the flattened ends, a wheel having an opening in engagement with the flattened portion adjacent the end of the axle, and a supplemental hub carried by the wheel having an opening engaging the rounded portion of the axle, which is located between the flattened end and adjacent flattened portion of the axle.

Signed at New York city, N. Y., this 9 day of February, 1920.

SAMUEL BERGER.

Witnesses:
    MAURICE BLOCK,
    EDWARD A. JARVIS.